(12) United States Patent
Holzherr et al.

(10) Patent No.: US 11,728,664 B2
(45) Date of Patent: Aug. 15, 2023

(54) AEROSOL-GENERATING SYSTEM WITH CHARGING DEVICE AND AEROSOL-GENERATING DEVICE WITH END CONTACTS

(71) Applicant: Philip Morris Products S.A., Neuchatel (CH)

(72) Inventors: Raphael Holzherr, Neuchatel (CH); Hankak Lee, Seoul (KR)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 17/687,180

(22) Filed: Mar. 4, 2022

(65) Prior Publication Data

US 2022/0271546 A1   Aug. 25, 2022

Related U.S. Application Data

(63) Continuation of application No. 16/637,985, filed as application No. PCT/EP2017/071979 on Sep. 1, 2017, now Pat. No. 11,303,142.

(30) Foreign Application Priority Data

Aug. 23, 2017   (EP) .................................. 17187604

(51) Int. Cl.
*A24F 13/00*   (2006.01)
*H02J 7/00*   (2006.01)
(Continued)

(52) U.S. Cl.
CPC ............ *H02J 7/0044* (2013.01); *A24F 40/40* (2020.01); *A24F 40/90* (2020.01); *H02J 7/0045* (2013.01); *A24F 40/20* (2020.01)

(58) Field of Classification Search
CPC ...................................................... A24F 47/00
(Continued)

(56) References Cited

U.S. PATENT DOCUMENTS 10,433,584 B2   10/2019   Nettenstrom et al.
10,433,984 B2   10/2019   Van Wiemeersch
(Continued)

FOREIGN PATENT DOCUMENTS

CN       203491758 U       3/2014
CN       204132393 U       2/2015
(Continued)

OTHER PUBLICATIONS

U.S. Appl. No. 16/637,985, filed Feb. 10, 2020, U.S. Pat. No. 2020/0214357, Raphael Holzherr, et al.
(Continued)

*Primary Examiner* — Phuong K Dinh
(74) *Attorney, Agent, or Firm* — Oblon, McClelland, Maier & Neustadt, L.L.P.

(57)   ABSTRACT

An electrically operable aerosol-generating system is provided, including: a charging device including a primary power source and a housing to retain the power source; and an aerosol-generating device including a secondary power source and having proximal and distal ends and a body extending therebetween, the charging device having a docking arrangement including a docking space between a first end and an opposing second end spaced therefrom, the first and second ends being walls of the housing, electrical contacts on at least one of the proximal or distal ends of the device to engage with corresponding electrical contacts on at least one of the first and second ends of the docking arrangement, and the electrical contacts include a positive and a negative electrical contact, at least one of which being (Continued)

an annular electrical contact, arranged concentrically on the at least one of the proximal or distal ends.

20 Claims, 7 Drawing Sheets

(51) Int. Cl.
*A24F 40/90* (2020.01)
*A24F 40/40* (2020.01)
*A24F 40/20* (2020.01)

(58) Field of Classification Search
USPC .................................................. 131/328–329
See application file for complete search history.

(56) References Cited

U.S. PATENT DOCUMENTS

| | | | |
|---|---|---|---|
| 11,547,152 B2* | 1/2023 | Schennum | ............ H02J 7/0042 |
| 2014/0378790 A1 | 12/2014 | Cohen | |
| 2015/0245658 A1 | 9/2015 | Worm et al. | |
| 2015/0328415 A1 | 11/2015 | Minskoff et al. | |
| 2016/0192712 A1 | 7/2016 | Memari et al. | |
| 2016/0345628 A1 | 12/2016 | Sabet | |
| 2016/0366946 A1 | 12/2016 | Murison et al. | |
| 2017/0094999 A1 | 4/2017 | Hearn et al. | |
| 2017/0181471 A1 | 6/2017 | Phillips et al. | |
| 2017/0206865 A1 | 7/2017 | Nettenstrom et al. | |

FOREIGN PATENT DOCUMENTS

| | | |
|---|---|---|
| CN | 205512351 U | 8/2016 |
| CN | 106572708 A | 4/2017 |
| DE | 10 2014 207 154 A | 10/2015 |
| JP | 3135673 U | 9/2007 |
| JP | 2013-156755 A | 8/2013 |
| JP | 2015-504669 A | 2/2015 |
| JP | 2016-512116 A | 4/2016 |
| KR | 10-1232619 B1 | 2/2013 |
| KR | 10-2014-0109455 A | 9/2014 |
| KR | 10-2014-0119029 A | 10/2014 |
| KR | 10-2017-0069201 A | 6/2017 |
| KR | WO 2017/130173 A1 | 8/2017 |
| RU | 2 531 890 C2 | 10/2014 |
| WO | 2016/059073 A1 | 4/2016 |
| WO | WO 2016/059104 A | 4/2016 |
| WO | WO 2016/094885 A1 | 6/2016 |
| WO | 2016/107763 A1 | 7/2016 |

OTHER PUBLICATIONS

European Office Action dated Aug. 25, 2022 in European Patent Application No. 17762092.9, citing document 15 therein, 4 pages.
International Search Report and Written Opinion dated Apr. 9, 2018 in PCT/EP2017/071979 filed Sep. 1, 2017.
Combined Russian Office Action and Search Report dated Nov. 16, 2020 in corresponding Russian Patent Application No. 2020110005 (with English Translation) citing documents AC-AE and AR-AT therein, 13 pages.
Office Action dated Jul. 5, 2021 in corresponding Japanese Patent Application No. 2020-510608 (with English Translation), citing documents AU and AV therein. 8 pages.
Chinese Office Action dated Jan. 11, 2023 in Chinese Patent Application No. 201780094126.1 filed on Sep. 1, 2017, with English translation, total 17 pages.
European Office Action dated Jan. 2, 2023 in European Patent Application No. 17762092.9 filed Sep. 1, 2017, total 11 pages.
Korean Office Action dated Jan. 18, 2023 in Korean Patent Application No. 10-2020-7004413 filed on Sep. 1, 2017, total 9 pages.
Notification of Reasons for Refusal dated May 15, 2023 in Japanese Patent Application No. 2022-053942 filed on Mar. 29, 2022, with English translation, total 7 pages.
Korean Notice of Allowance dated Jun. 9, 2023 in Korean Patent Application No. 2020-7004413 filed Sep. 1, 2017, with English translation.

* cited by examiner

AEROSOL-GENERATING SYSTEM WITH CHARGING DEVICE AND AEROSOL-GENERATING DEVICE WITH END CONTACTS

CROSS-REFERENCE TO RELATED APPLICATIONS

This application is a continuation of and claims benefit under 35 U.S.C. § 120 to U.S. patent application Ser. No. 16/637,985, filed Feb. 10, 2020, which is a U.S. national stage application of PCT/EP2017/071979, filed Sep. 1, 2017, and claims priority under 35 U.S.C. § 119 to EP 17187604.8, filed Aug. 23, 2017, the entire contents of each of which are incorporated herein by reference.

TECHNICAL FIELD

The present invention relates to an electrically operated aerosol-generating system and particularly to an electrically operated aerosol-generating system having an aerosol-generating device, and a charging device for receiving and charging the aerosol-generating device.

DESCRIPTION OF THE RELATED ART

Electrically operated aerosol-generating systems generally comprise an aerosol-forming substrate and an atomiser, which is operated to atomise volatile compounds in the aerosol-forming substrate to form an aerosol for inhalation by a user. Typically, electrically operated aerosol-generating systems also comprise an aerosol-generating device comprising an electrical power supply for supplying power to the atomiser. The atomiser may be an electrically operated heating means, for example an electric heater.

In some systems, an aerosol-generating device is configured to receive an aerosol-generating article comprising a solid aerosol-forming substrate, for example a substrate comprising homogenised tobacco. In these systems, the device typically comprises the atomiser, which is arranged to heat the aerosol-forming substrate when the article is received in the device. The article may also comprise a filter, which is wrapped together with the aerosol-forming substrate in the form of a rod, similar to a conventional cigarette. In some systems an aerosol-generating article may comprise a cartridge containing a liquid or gel aerosol-forming substrate that can be heated by an atomiser. In some systems, a device may be configured to receive a cartridge that comprises both the atomiser and a liquid aerosol-forming substrate. Such cartridges are often referred to as cartomisers. A common configuration of atomiser used in a cartomiser comprises a coil of heater wire wound around an elongate wick soaked in liquid aerosol-forming substrate.

Some electrically operated aerosol-generating systems comprise a separate charging device for releasably holding and recharging the aerosol-generating device when not in use. Such charging devices may also function as a case or holder and may provide a degree of protection for the aerosol-generating device. A charging device may also provide additional functions such as data-logging and refilling of the aerosol-generating device with aerosol-forming substrate.

Aerosol-generating devices typically have a high aspect ratio, having a first, longitudinal, dimension that is greater in magnitude than second and third, width, dimensions. Cases for holding aerosol-generating devices often comprise housings defining narrow openings into which a user is required to insert the device. The narrow openings typically have a width similar to the width of the aerosol-generating device. Users inserting an aerosol-generating device into these cases are generally required to closely align the aerosol-generating device with the narrow opening to insert the aerosol-generating device into the case, and then slide the aerosol-generating device longitudinally into the case. This can be difficult for users, especially in low light or when the user is moving.

It would be desirable to provide an aerosol-generating system which improves the speed and ease with which a user is able to insert an aerosol-generating device into a compatible charging device and remove the aerosol-generating device from the charging device.

SUMMARY

An electrically operable aerosol-generating system may be provided comprising, a charging device comprising a primary power source, and an elongated aerosol-generating device comprising a secondary power source and having a proximal end, a distal end, and a body extending between the proximal end and the distal end. The charging device has a docking arrangement configured to engage with the aerosol-generating device. The docking 35 arrangement comprises a docking space defined between a first end, and an opposing second end spaced from, and fixed relative to, the first end, the docking space accommodating a longitudinal dimension of the elongated aerosol-generating device between the first end and the second end. Electrical contacts are located on at least one of the proximal or distal end of the aerosol-generating device for engagement with 40 corresponding electrical contacts located on at least one of the first end and the second end of the docking arrangement.

BRIEF DESCRIPTION OF THE DRAWINGS

The invention will be further described, by way of example only, with reference to the accompanying drawings, in which.

DETAILED DESCRIPTION

Figure 1:
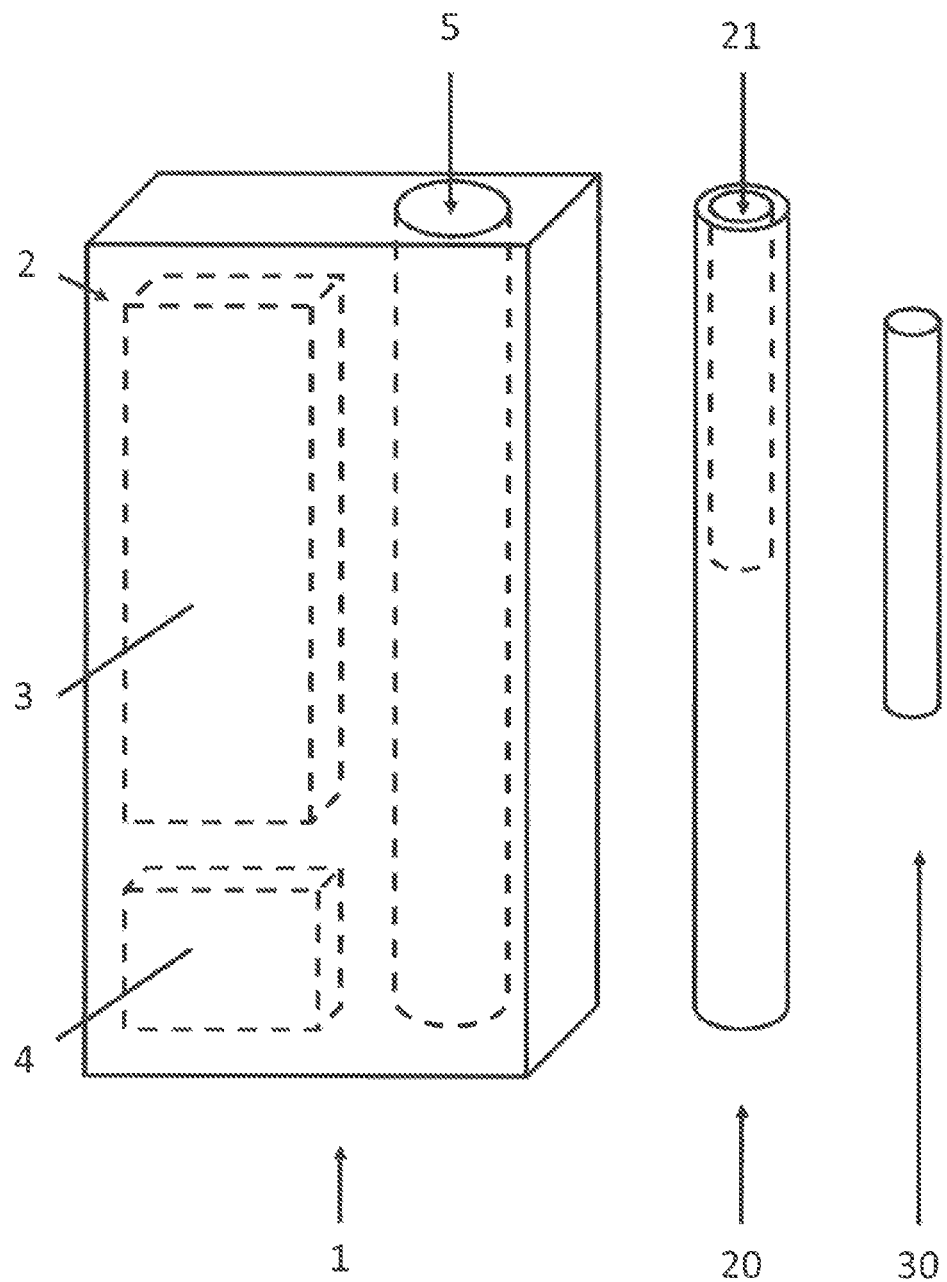
FIG. 1 shows a schematic illustration of a known electrically operated aerosol-generating system comprising an aerosol-generating article, an aerosol-generating device and a charging device for charging the aerosol-generating device.

Preferably, at least a portion of the aerosol-generating device remains exposed when the aerosol-generating device is engaged with the charging device. For example at least one side surface of a body of the aerosol-generating device may be exposed and form an external surface of the aerosol-generating system when the aerosol-generating device is engaged with the charging device.

Preferably, engagement between the aerosol-generating device and the docking arrangement is effected by relative movement of the aerosol-generating device and the receiving portion in a direction perpendicular, or substantially perpendicular, to the longitudinal axis of the aerosol-generating device.

Preferably, the first end and the second end form part of the charging device, for example form part of a housing of the charging device. The first end and the second end may be walls of the housing of the charging device. The first end and the second end may be members that extend from the housing of the charging device. Preferably, the docking space is at least partially external to the charging device. For example, the docking space may be open to the environment external to the charging device when the aerosol-generating device is not accommodated within the docking space.

Preferably, the charging device comprises a housing for retaining the primary power source. The primary power source may be, for example, a rechargeable battery retained by or within a housing of the charging device. Preferably, engagement between the charging device and the aerosol-generating device when the aerosol-generating device is accommodated by the docking space allows the secondary power source of the aerosol-generating device to be charged by the primary power source of the charging device. For example, electrical contacts located on the aerosol-generating device are arranged to engage with corresponding electrical contacts located on the charging device when the aerosol-generating device has been engaged with the docking arrangement and may be used for charging.

As used herein, the term 'aerosol-generating device' refers to a device that interacts with an aerosol-forming substrate to generate an aerosol that is directly inhalable into a user's lungs thorough the user's mouth. In certain embodiments, an aerosol-generating device may heat an aerosol-forming substrate to facilitate the release of the volatile compounds. An aerosol-generating device may interact with an aerosol-generating article comprising an aerosol-forming substrate or a cartridge comprising an aerosol-forming substrate. An electrically operated aerosol-generating device may comprise an atomiser, such as an electric heater, to heat the aerosol-forming substrate to form an aerosol.

As used herein, the term 'aerosol-generating article' refers to an article comprising an aerosol-forming substrate capable of releasing volatile compounds, which can form an aerosol. In certain embodiments, the aerosol-generating article may comprise an aerosol-forming substrate capable of releasing upon heating volatile compounds, which can form an aerosol.

As used herein, the terms 'upstream', 'downstream', 'proximal' and 'distal' are used to describe the relative positions of components, or portions of components, of aerosol-generating devices, aerosol-generating articles and cases.

As used herein, the term 'longitudinal' is used to describe the direction between a downstream, proximal or mouth end and the opposed upstream or distal end and the term 'transverse' is used to describe the direction perpendicular to the longitudinal direction.

As used herein, the term 'length' is used to describe the maximum longitudinal dimension between the distal or upstream end and the proximal or downstream end of components, aerosol-generating devices and aerosol-generating articles.

As used herein, the term 'diameter' is used to describe the maximum transverse dimension of components, for example aerosol-generating devices, aerosol-generating articles and cases.

As used herein, the term 'transverse cross-section' is used to describe the cross-section of components, aerosol-generating devices, aerosol-generating articles and cases in the direction perpendicular to the major axis of the components, aerosol-generating devices, aerosol-generating articles and cases, respectively.

As used herein, the term 'exposed' is used to indicate that a portion of a feature or component is open to the external environment and not encased or covered.

The term 'magnetic material' is used herein to describe a material which is able to interact with a magnetic field, including both paramagnetic and ferromagnetic materials. A magnetisable material may be a paramagnetic material, such that it only remains magnetised in the presence of an external magnetic field. Alternatively, a magnetisable material may be a material which becomes magnetised in the presence of an external magnetic field and which remains magnetised after the external field is removed (a ferromagnetic material, for example). The term "magnetic material" as used herein encompasses both types of magnetisable material, as well as material which is already magnetised.

The elongated aerosol-generating device is configured to generate an inhalable aerosol from an aerosol-forming substrate. The elongated aerosol-generating device may be substantially shaped like a cigarette or cigar. For example, the elongated aerosol-generating device may have a first, longitudinal or length, dimension that is greater in magnitude than second and third, width, dimensions. The second and third dimensions may be denoted as width and thickness, although the second and third dimensions are preferably substantially the same and may, therefore, both be referred to as width. The elongated aerosol-generating device may be substantially cylindrical. The longitudinal dimension defines a longitudinal axis. Width dimensions extend perpendicular to the longitudinal axis. The elongated aerosol-generating device may be described as having a proximal end and a distal end, with an elongate body defined between the proximal end and the distal end. The body may comprise at least one side surface extending between the proximal end and the distal end.

The docking space may be further defined by a rear portion extending between the first end and the second end. Thus, the docking space may be at least partially defined by the first end, the second end, and a rear portion. The rear portion may be a rear wall. The rear portion may be part of an external wall of a housing of the charging device.

The aerosol-generating device may be easily engaged and disengaged with the docking arrangement by movement into the docking space in a direction perpendicular to a longitudinal axis of the aerosol-generating device, that is movement in a transverse direction relative to the aerosol-generating device. The aerosol-generating device may be easily engaged and disengaged with the docking arrangement by movement into the docking space in a direction substantially perpendicular to a longitudinal axis of the aerosol-generating device. For example, either a proximal end or a distal end of the aerosol-generating device may be inserted into engagement with the charging device in the docking space. The opposite end may then be pivoted into the docking space such that the aerosol-generating device is fully engaged with the charging device. By using perpendicular, or substantially perpendicular, movement, less distance needs to be travelled to engage the aerosol-generating device and the charging device than would be the case in a typical system that accepts the aerosol-generating device when inserted in a longitudinal direction into a charging device. The docking space of the charging device accommodates the longitudinal dimension of the aerosol-generating device. If present, an opening to the docking space accommodates the longitudinal dimension of the aerosol-generating device. Thus, it is easier to locate the aerosol-generating device in the docking space than would be the case if the docking space was dimensioned to accommodate only transverse dimensions of the aerosol-generating device.

The docking space may at least partially form an open groove in a housing of the charging device. Thus, the docking space may be, at least partially, defined by a first side wall, a second side wall, a rear wall, and the first and second ends. The open groove may be an elongated depression or slot defined by a housing of the charging device. The elongated aerosol-generating device may be entirely accepted within the open groove such that no portion of the aerosol-generating device extends beyond a peripheral boundary of the charging device. Alternatively, the elongated aerosol-generating device may be only partially accepted within the open groove. In this case, a portion of the aerosol-generating device, which may be termed an exposed portion, extends beyond a peripheral boundary of the charging device.

It may be advantageous that a portion of the aerosol-generating device forms an external surface of the system when the aerosol-generating device is engaged with the charging device. For example, it may be advantageous that at least one side surface of a body of the aerosol-generating device forms an external surface of the system when the aerosol-generating device is engaged with the charging device. The aerosol-generating device may be easily retrieved by a user, who would then merely need to grip the exposed portion of the aerosol-generating device and disengage the aerosol-generating device from the charging device. The exposed portion of the aerosol-generating device may be shaped to conform or correspond to a shape of a housing of the charging device. The charging device may have a housing that is shaped or contoured, and the aerosol-generating also have a housing or external surface that is configured to conform to the shape or contour of the charging device housing when the aerosol-generating device is engaged with the charging device. The aerosol-generating device may act to close or cover an open groove in the charging device. Thus, charging device features such as displays, indicators, contacts, or buttons located in such an open groove may be shielded from the external environment when an aerosol-generating device is engaged with the charging device. In this way, displays, indicators, contacts, or buttons may be protected when the aerosol-generating device is engaged with the charging device, for example during transit.

In some embodiments the first end and the second end are located on projections extending from a housing of the charging device, for example first and second projections extending from the housing. The projections may be termed lugs. Thus, a longitudinal dimension of the docking space may be defined between opposing first and second ends located on the first and second projections. The docking space may not be constrained in any other dimension. An aerosol-generating device engaged with such a docking space would only have contact with the first and second ends and would, when engaged, extend longitudinally between the projections. Alternatively, the docking space may be further constrained by a rear wall extending between the first and second projections. The docking space may be still further constrained by one or more side walls extending between the first and second projections.

The docking space is preferably configured to receive the aerosol-generating device when the aerosol-generating device is urged into the docking space in a direction perpendicular to the longitudinal dimension of the aerosol-generating device. Thus when engaged with the charging device, the longitudinal dimension of the aerosol-generating device is preferably parallel to a side or an edge of the charging device.

The docking arrangement may comprise latching means such as a mechanical latch to releasably retain the aerosol-generating device in engagement with the docking arrangement. For example, a latching projection may be configured to extend from the first end or the second end to engage with a distal end or proximal end of the aerosol-generating device. The latching projection may be biased away from the first or second end, for example by a spring. The latching projection may extend from the first or second end when actuated by a user. The latching projection may interact with a corresponding dimple, depression, slot, or groove defined at a distal end or a proximal end of the aerosol-generating device. A mechanical latch may be located at both first and second ends to releasably retain both the distal end and the proximal end of the aerosol-generating device. Likewise, the proximal end, or the distal end, or both proximal end and distal end, of the aerosol-generating device may comprise a latching projection as described above, and the latching projection may interact with a corresponding dimple, depression, slot, or groove defined at the first end, or the second end of the aerosol-generating device.

A latching means may comprise one or more magnet. For example, the docking arrangement may comprise a magnetic latch to releasably retain the aerosol-generating device in engagement with the docking arrangement. One or more magnet may be located on the charger, for example on a portion of the charger at or near to either the first end or the second end. The aerosol-generating device would then include one or more portions that are magnetically attracted to the one or more magnet to retain the aerosol-generating device engaged with the charging device when the aerosol-generating device is aligned within the docking space. One or more magnet may be located on the aerosol-generating device, for example on a portion of the aerosol-generating device at or near to either the distal end or the proximal end. The charging device would then include one or more portions that are magnetically attracted to the one or more magnet to retain the aerosol-generating device engaged with the charging device when the aerosol-generating device is aligned within the docking space.

Magnets for latching may be included on both the charging device and the aerosol-generating device. The magnet on one of the charging device and the aerosol-generating device may present a north pole and the corresponding magnet on the other of the charging device and the aerosol-generating device may present a south pole. The aerosol-generating device may comprise a pair of longitudinally spaced magnets and the charging device may comprise a pair of corresponding magnets arranged to latch with the pair of magnets on the aerosol-generating device. The pair of longitudinally spaced magnets may be termed first and second aerosol-generating device magnets and the pair of corresponding magnets may be termed first and second charging device magnets. The first aerosol-generating device magnet may be located at or near the proximal end of the aerosol-generating device. The second aerosol-generating device magnet may be located at or near the distal end of the aerosol-generating device. Both the first and second aerosol-generating device magnets may have a north-pole polarity, in which case both first and second charging device magnets will have a south-pole polarity. If both the first and second aerosol-generating device magnets have a south-pole polarity, both first and second charging device magnets will have a north-pole polarity. If the first and second aerosol-generating device magnets are spaced symmetrically about the longitudinal mid-point of the aerosol-generating device, such an arrangement may allow the aerosol-generating device to latch with the charging device in either longitudinal orientation. In one arrangement, the first aerosol-generating device magnet may present a north-pole polarity and the second aerosol-generating device magnet may present a south-pole polarity. In this case, the first charging device magnet will present a south-pole polarity and the second charging device magnet will present a north-pole polarity. This configuration will allow the aerosol-generating device to latch with the charging device when the aerosol-generating device is presented in a configuration in which the first aerosol-generating device magnet aligns with the first charging device magnet, but latching will not occur when the aerosol-generating device is presented in a configuration in which the first aerosol-generating device magnet aligns with the second charging device magnet. This may advantageously ensure that latching only occurs in a specific longitudinal orientation. This may be termed magnetic keying.

Preferably, magnets used for latching are high powered magnets such as rare earth magnets, for example NdFeB magnets. High powered magnets need only be of small size to retain the aerosol-generating device and the charging device.

The aerosol-generating device may be retained in engagement with the charging device by interference. For example, a distal end of the aerosol-generating device may engage with the first end and a proximal end of the aerosol-generating device may engage with the second end, the frictional engagement between opposite ends of the device and the first and second end of the charging device retaining the aerosol-generating device in engagement with the charging device. Biasing means, such as a spring, may be located at on or either end of the aerosol-generating device to assist with providing interference when the aerosol-generating device and the charging device are engaged. Biasing means may also assist with providing a pressure between contacts located on the aerosol-generating device and contacts located on the charging device to increase reliability of those contacts during engagement between the aerosol-generating device and the charging device.

The aerosol-generating device may comprise electrical contacts located on at least one of the proximal or distal end of the aerosol-generating device, and the charging device may comprise corresponding electrical contacts located on both the first end and the second end of the docking arrangement. The aerosol-generating device may comprise electrical contacts located at a distal end, and the charging device may comprise corresponding electrical contacts located on both the first end and the second end of the docking arrangement. The aerosol-generating device may comprise electrical contacts located at a proximal end, and the charging device may comprise corresponding electrical contacts located on both the first end and the second end of the docking arrangement. Alternatively, the charging device may comprise electrical contacts located at the first end, and the aerosol-generating device may comprise corresponding electrical contacts located on both the proximal end and the distal end. The charging device may comprise electrical contacts located at the second end, and the aerosol-generating device may comprise corresponding electrical contacts located on both the proximal end and the distal end.

It may be advantageous if charging contacts are configured concentrically, for example as concentric rings in an end face of the aerosol-generating device, for example in a distal end face of the aerosol-generating device. Electrical contacts located on at least one of the proximal or distal end of the aerosol-generating device may include a positive electrical contact and negative electrical contact, at least one of the positive and negative electrical contacts being an annular electrical contact, the positive and negative electrical contacts preferably being arranged concentrically on the at least one of the proximal or distal end of the aerosol-generating device. Electrical contacts located on the at least one of the proximal or distal end of the aerosol-generating device may include an annular positive electrical contact and an annular negative electrical contact, the positive and negative electrical contacts being arranged concentrically on the at least one of the proximal or distal end of the aerosol-generating device. Thus, a distal end face of the aerosol-generating device may comprise first and second concentric electrical contacts arranged as concentric rings, the first electrical contact being a positive contact and the second electrical contact being a negative contact. It is not essential that both contacts are concentric rings. One contact may be a point contact and the other contact may be a ring surrounding the point contact.

Corresponding contacts, which may or may not be in the form of concentric rings, may be defined on the first end or the second end of the charging device to allow for electrical coupling between the aerosol-generating device and the charging device. Electrical contacts may be located on at least one of the first end and the second end of the docking arrangement and may include an annular positive electrical contact and an annular negative electrical contact, the positive and negative electrical contacts being arranged concentrically on the at least one of the first end and the second end of the docking arrangement. The first end or the second end of the charging device may comprise first and second concentric electrical contacts arranged as concentric rings, the first electrical contact being a positive contact and the second electrical contact being a negative contact. Corresponding contacts, which may or may not be in the form of concentric rings, may then be defined on the distal end or the proximal end of the aerosol-generating device to allow for electrical coupling between the aerosol-generating device and the charging device. The use of contacts in the form of a ring, or rings, allows the aerosol-generating device to be oriented in any radial direction when engaged with the charging device. That is, because at least one portion of a contact set is in the form of a ring, the corresponding contact can be positioned such that contact is always made, whatever the radial orientation that the aerosol-generating device is in when presented to the docking arrangement of the charging device. This may further simplify the engagement and disengagement of the respective devices, as a user does not need to be concerned with radial orientation of the aerosol-generating device.

Charging contacts may allow for data transfer between the aerosol-generating device and the charging device as well as allowing for the charging of the secondary power source. Alternatively, one or more dedicated data transfer contacts may be defined on the aerosol-generating device and the charging device to allow for data transfer between the devices.

The aerosol-generating system may comprise wireless data transfer means, for example a BLUETOOTH® connectivity.

The aerosol-generating system may be configured such that the aerosol-generating device may be charged whichever longitudinal orientation it is engaged with the charging device. In an advantageous configuration, the aerosol-generating device may comprise charging contacts located at, or near to, at least one of a distal end or a proximal end, and the charging device comprises corresponding charging contacts located on both the first end and the second end of the docking arrangement. Thus, even if the aerosol-generating device only includes charging contacts on one of the distal end and proximal end, an electrical connection can be made whichever orientation the aerosol-generating device is presented to the charging device. Thus, if the aerosol-generating device comprises charging contacts located at its distal end and the charging device comprises corresponding charging contacts located on both the first end and the second end of the docking arrangement, the aerosol-generating device may be engaged with the docking arrangement in either a first position in which the distal end of the aerosol-generating device engages with the first end of the charging device and the proximal end of the aerosol-generating device engages with the second end of the charging device, or a second position in which the distal end of the aerosol-generating device engages with the second end of the charging device and the proximal end of the aerosol-generating device engages with the first end of the charging device. In this configuration, a user need not be concerned with correctly orienting the aerosol-generating device in the charging device. This may be particularly advantageous when using the system in low light conditions. The aerosol-generating device may, similarly, have electrical contacts for charging the secondary battery located at both its proximal and distal ends, thereby giving effect to an ability to charge the secondary power source whichever longitudinal orientation the aerosol-generating device is engaged with the charging device.

The system may similarly be configured such that any data connection between the aerosol-generating device and the charging device can be made irrespective of the engagement orientation.

Advantageously, the aerosol-generating device may comprise one or more status indication means, such as status indication lights, that extend circumferentially around the aerosol-generating device. Thus, status information may be determined by a user without needing to search the device for the correct aspect for viewing the status indication means. It may be particularly advantageous that the status indication means can be viewed whichever radial orientation the aerosol-generating device is engaged with the charging device. Status information can thus be viewed during charging, without the need to specifically orient the aerosol-generating device.

A preferred status indication means may comprise more than one light spaced apart longitudinally on the aerosol-generating device, each light extending circumferentially around the device. Each light may indicate status of a different parameter. Progress of a status, such as battery charge level, may be indicated by illuminating more or fewer lights. Each separate indication light may comprise a ring of circumferentially spaced light-emitting diodes (LEDs). Each separate indication light may be a ring-shaped LED that extends circumferentially around the aerosol-generating device.

The aerosol-generating device may comprise one or more user actuatable buttons located on a first side wall of the aerosol-generating device. The aerosol-generating device may comprise one or more displays located on the first side wall of the aerosol-generating device. The aerosol-generating device may comprise one or more contacts, such as electrical contacts or data contacts, located on the first side wall of the aerosol-generating device. The aerosol-generating device may comprise any combination of user actuatable buttons, displays, and contacts, such as electrical contacts or data contacts located on the first side wall of the aerosol-generating device. The system may be advantageously configured such that the first side wall faces the charging device when the aerosol-generating device is coupled to the charging device. For example, the docking arrangement may be configured such that the first side wall faces the charging device when the aerosol-generating device is located in the docking space. In this configuration the aerosol-generating device is radially oriented in a specific orientation for engagement with the charging device. Such orientation may be effected by keying means that prevents the aerosol-generating device from engagement with the charging device in any other than the desired orientation. An advantage of such orientation is that buttons on the aerosol-generating device may be protected from accidental actuation when the aerosol-generating device is engaged with the charging device. Likewise, any display may be protected from accidental damage when the aerosol-generating device is engaged with the charging device. Furthermore, any contacts may be aligned with corresponding contacts on the charging device.

Preferably, at least a portion of the aerosol-generating device remains exposed when the aerosol-generating device is engaged with the charging device. For example, preferably at least one side wall of the aerosol-generating device, for example at least one external side wall, remains exposed to the external environment when the aerosol-generating device is engaged with the charging device. A user may be more easily able to take hold of the exposed surface of the at least one external side wall to facilitate disengagement of the aerosol-generating device from the charging device. A user may be able to grip the exposed surface and apply pressure to disengage the aerosol-generating device from the charging device. The aerosol-generating device may, therefore, be easier to retrieve from engagement with the charging device. The at least one external side wall preferably does not locate any user actuatable buttons, displays, and contacts. If the transverse cross-section of the aerosol-generating device is approximated to a circle, the at least one external side wall may comprise at least 180 degrees of the circumference of the circle, for example at least 240 degrees, or at least 250 degrees, or at least 260 degrees, or at least 270 degrees of the circumference of the circle. The remaining circumference of the circle comprises the first side wall of the aerosol-generating device. It may be that at least 4 mm of the diameter of the aerosol-generating device remains exposed when the aerosol-generating device is engaged with the charging device. This exposed portion may provide a surface for a user to grip the aerosol-generating device. Preferably, at least 5 mm of the diameter of the aerosol-generating device remains exposed when the aerosol-generating device is engaged with the charging device, for example at least 6 mm, or at least 7 mm, or at least 8 mm, or at least 9 mm, or at least 10 mm.

The charging device may define a docking space that is an open groove defined, at least partially, by a first side wall, a second side wall, a rear wall, and the first and second ends. Portions of the first side wall or the second side wall or both the first side wall and the second side wall may be partially cut away to expose more of the aerosol-generating device. Such cut away wall portions may facilitate the disengagement of the aerosol-generating device from the charging device by increasing the exposed surface of the aerosol-generating device in the region of the cut away wall portions.

Preferably, the one or more user actuatable buttons, one or more displays, or one or more contacts, such as electrical contacts or data contacts, are not exposed when the aerosol-generating device is engaged with the charging device to protect them from accidental actuation.

The aerosol-generating device may comprise a mouthpiece at its proximal end. Thus, the mouthpiece may directly engage with either the first end or second end of the docking arrangement. The mouthpiece may comprise the proximal end of the aerosol-generating device and a portion of the body of the aerosol-generating device extending towards the distal end of the aerosol-generating device. The mouthpiece preferably comprises a channel for passage of aerosol generated by the aerosol-generating device, for example a channel that has an opening defined in the proximal end of the aerosol-generating device such that a user can draw aerosol into their mouth by drawing on the mouthpiece.

The mouthpiece may comprise one or more electrical or data contacts configured to contact with corresponding electrical or data contacts located on the charging device. The mouthpiece may comprise means for facilitating docking of the aerosol-generating device to the charging device. For example, the mouthpiece may comprise a dimple or depression or slot or groove for receiving a movable projection located on the charging device to mechanically latch the aerosol-generating device and the charging device. Likewise, the mouthpiece may comprise a movable projection for interacting with a dimple or depression or slot or groove located on the charging device to mechanically latch the aerosol-generating device and the charging device.

The mouthpiece may be a separable mouthpiece that is removably separable from the aerosol-generating device. This may facilitate cleaning of the mouthpiece. Further, a separable mouthpiece may allow access to an internal portion of the aerosol-generating device. This may be desirable in order to, for example, replace an aerosol-forming substrate located within the aerosol-generating device. An aerosol-forming substrate may be located or contained within a separable mouthpiece, such that a replacement mouthpiece may be provided to replenish aerosol-forming substrate.

The aerosol-generating device may comprises a replaceable substrate section containing an aerosol-forming substrate. The replaceable substrate section may form a portion of body of the aerosol-generating device and may itself locate or contain a portion of aerosol-forming substrate for consumption in the device. The replaceable substrate section may be located distal to the proximal end of the device, for example distal to a mouthpiece. The replaceable substrate section may be located proximal to the distal end of the device. The replaceable substrate section may be coupled to one or more other sections forming the body of the aerosol-generating device by coupling means such as screw threads, or bayonet fitting, or magnetic connection, or mechanical latching means such as snap fits or interference fit.

A replaceable substrate section may comprise a reservoir of liquid aerosol-forming substrate. For example, a replaceable substrate section may comprise a reservoir of a liquid comprising nicotine and an aerosol former such as propylene glycol or glycerine. Alternatively, a replaceable substrate section may comprise a container of solid aerosol-forming substrate, or a container of colloidal aerosol-forming substrate such as a gel substrate.

The aerosol-generating device may comprises a replaceable substrate section containing two or more components which form an aerosol when combined.

A replaceable substrate section may comprise an atomizer, such as a heating element for heating the aerosol-forming substrate, or for heating at least one of the two or more components which form an aerosol when combined. Thus, a replaceable substrate section may be a form of cartomizer and include both an aerosol-forming substrate and an atomizing component. The replaceable substrate section would, in such embodiments, preferably include electrical contacts configured to contact corresponding electrical contacts on a battery portion of the aerosol-generating device to provide power for actuation of the atomizer.

In preferred embodiments, the atomizer may be a resistance heater such as a resistive wire, or a resistive track on a substrate. In other embodiments, the atomizer may be an inductive susceptor capable of heating when within a fluctuating magnetic field generated by an inductive coil.

In other preferred embodiments, the aerosol-generating device may comprise a substrate receiving cavity for receiving a consumable aerosol-generating article comprising an aerosol-forming substrate. Examples of aerosol-generating articles include sachets filled with solid aerosol-forming substrates, cigarettes and cigarette-like articles that include an aerosol-forming substrate contained within a wrapper such as a cigarette paper, capsules or containers of liquid aerosol-forming substrate or colloidal aerosol-forming substrate. The consumable aerosol-generating article may comprise a replaceable substrate section containing two or more components which form an aerosol when combined.

A consumable aerosol-generating article may comprise an atomizer, such as a heating element for heating the aerosol-forming substrate, or for heating at least one of the two or more components which form an aerosol when combined. Thus, a consumable aerosol-generating article may be a form of cartomizer and include both an aerosol-forming substrate and an atomizing component. The consumable aerosol-generating article would, in such embodiments, preferably include electrical contacts configured to contact corresponding electrical contacts on a battery portion of the aerosol-generating device to provide power for actuation of the atomizer.

In embodiments, the atomizer may be a resistance heater such as a resistive wire, or a resistive track on a substrate. In other embodiments, the atomizer may be an inductive susceptor capable of heating when within a fluctuating magnetic field generated by an inductive coil.

A preferred consumable aerosol-generating article may be in the form of a cigarette or cigarette-like article comprising a solid aerosol-forming substrate contained within a wrapper. Preferably such an article includes a mouth end intended to be inserted into a user's mouth for consumption of the article. Preferably, the mouth end includes a filter to emulate a conventional tailored cigarette. Preferably, the consumable aerosol-generating article is configured to interact with an atomizer, preferably a heater, located in the body of the aerosol-generating device. Thus, a heating means such as a resistance heating element may be located in or around the substrate receiving cavity for receiving the consumable aerosol-generating article. The substrate receiving cavity may be located at a proximal end of the device. For example, an opening to the substrate receiving cavity may be located at the proximal end of the device.

The aerosol-generating device may comprise a heating element for heating a consumable aerosol-generating article. The heating element may be an internal heater designed to be inserted into a consumable aerosol-generating article, for example a resistive heating element or a susceptor in the form of a pin or blade that can be inserted into an aerosol-forming substrate located within a consumable aerosol-generating article. The heating element may be an external heater designed to heat an external surface of a consumable aerosol-generating article, for example a resistive heating element or a susceptor located at the periphery of, or surrounding, a substrate receiving cavity for receiving the consumable aerosol-generating article.

It may be advantageous that the aerosol-generating system comprises more than one aerosol-generating article. It may be further advantageous that the aerosol-generating system is capable of simultaneously retaining or charging more than one aerosol-generating device. A system may be provided in which, the docking arrangement is a first docking arrangement comprising a first docking space, and the charging device further comprises a second docking arrangement configured to engage with the aerosol-generating device. The second docking arrangement comprises a second docking space defined by a third end, and an opposing fourth end spaced from and fixed relative to the third end, the second docking space accommodating a longitudinal dimension of the elongated aerosol-generating device. Any feature of a system defined above relating to a docking arrangement may be applied mutatis mutandis to the first docking arrangement and the second docking arrangement of this embodiment.

Advantageously, the system may comprise more than one aerosol-generating device. For example, the system may comprise first and second aerosol-generating devices that are both configured to engage with the charging device to be charged. Preferably, the charging device comprises first and second docking arrangements such that the first and second aerosol-generating devices may be simultaneously coupled to the charging device.

An aerosol-generating system as described above may further comprise one or more consumable aerosol-generating articles. The system may comprise consumable aerosol-generating articles in the form of rods comprising a solid aerosol-forming substrate. For example, the consumable aerosol-generating articles may comprise a plurality of elements, including a solid aerosol-forming substrate, that are circumscribed by a wrapper in the manner of a traditional cigarette.

A charging device for an electrically operable aerosol-generating system may also be provided. A charging device may comprise a primary power source and have a docking arrangement configured to engage with an elongated aerosol-generating device. The docking arrangement preferably comprises a docking space defined between a first end, and an opposing second end spaced from and fixed relative to the first end. The docking space accommodates a longitudinal dimension of the elongated aerosol-generating device.

A charging device may comprise a primary power source and have a first docking arrangement configured to engage with an elongated aerosol-generating device. The first docking arrangement preferably comprises a first docking space defined between a first end, and an opposing second end spaced from and fixed relative to the first end. The first docking space accommodates a longitudinal dimension of the elongated aerosol-generating device. The charging device may further comprise a second docking arrangement configured to engage with the elongated aerosol-generating device. The second docking arrangement preferably comprises a second docking space defined between a third end, and an opposing fourth end spaced from and fixed relative to the third end. The second docking space accommodates a longitudinal dimension of the elongated aerosol-generating device.

The charging device for an aerosol-generating system may be according to any embodiment as described above in relation to an aerosol-generating system.

An aerosol-generating device for an electrically operable aerosol-generating system may also be provided. An aerosol-generating device comprises a secondary power source and is configured to engage with a charging device in any aerosol-generating system as described above.

A method of recharging an elongated aerosol-generating device of an aerosol-generating system may comprise steps of aligning a longitudinal axis of the elongated aerosol-generating device with a docking arrangement having a docking space defined by a charging device, and urging the aerosol-generating device into engagement with the docking arrangement in a direction perpendicular to the longitudinal axis of the elongated aerosol-generating device. The aerosol-generating system, aerosol-generating device, and charging device are preferably any such devices as described above.

The charging device is configured to receive the aerosol-generating device. The charging device may have any suitable size and shape for receiving the aerosol-generating device. Typically, the charging device is portable. In other words, the charging device has a suitable size and shape to be carried by a user. The charging device may have a size and shape similar to a conventional packet of cigarettes. The charging device may have any suitable maximum transverse cross-section and any suitable length. In some embodiments, the charging device may have a shape, maximum transverse cross-section and length substantially similar to a conventional pack of cigarettes. The charging device may have a length between about 50 mm and about 200 mm. The charging device may have an external diameter, or maximum transverse cross-section, of between about 10 mm and about 50 mm.

The charging device may have a transverse cross-section of any suitable shape. For example, the charging device may have a substantially circular, elliptical, triangular, square, rhomboidal, trapezoidal, pentagonal, hexagonal or octagonal transverse cross-section. The charging device may have a substantially constant transverse cross-section along its length. The charging device may have a substantially rectangular transverse cross-section along its length. In particular embodiments, the charging device may be a substantially rectangular cuboid.

A housing may generally form the shape of the charging device. The housing may comprise one or more walls. In particular embodiments, the housing may be a substantially rectangular cuboid.

The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. In particular embodiments, the material is light and non-brittle.

The aerosol-generating device may be a handheld device. In other words, the aerosol-generating device may have any size and shape suitable to be held in the hand of a user. The aerosol-generating device may have a size and shape similar to a conventional cigarette or cigar. The aerosol-generating device may be portable.

The aerosol-generating device may have any suitable size and shape.

The aerosol-generating device may have a transverse cross-section of any suitable shape. For example, the aerosol-generating device may have a substantially circular, elliptical, triangular, square, rhomboidal, trapezoidal, pentagonal, hexagonal or octagonal transverse cross-section. In some particular embodiments, the aerosol-generating device has a substantially circular transverse cross-section.

The aerosol-generating device may have a substantially constant transverse cross-section along its length. The aerosol-generating device may have a substantially circular transverse cross-section along its length. The device may have rotational symmetry about its longitudinal axis. The device may have rotational symmetry of an order greater than one about its longitudinal axis. The device may be substantially axisymmetric about its longitudinal axis. In particular embodiments, the aerosol-generating device may be substantially circularly cylindrical.

The aerosol-generating device may have any suitable diameter (maximum transverse cross-section) and any suitable length. The aerosol-generating device may be elongate. In some particular embodiments, the aerosol-generating device may have a shape, diameter and length substantially similar to a conventional cigarette or cigar. The aerosol-generating device may have a length between about 30 mm and about 150 mm. The aerosol-generating device may have an external diameter between about 5 mm and about 30 mm.

The aerosol-generating device may be configured to receive one or more of a cartridge, an atomiser and an aerosol-generating article. The aerosol-generating device may be configured to receive one or more of a cartridge, an atomiser and an aerosol-generating article at a proximal end. The device may comprise a cavity for receiving one or more of a cartridge, an atomiser and an aerosol-generating article.

In some embodiments, the aerosol-generating device may comprise an atomiser. Where the aerosol-generating device comprises an atomiser, the device may be configured to receive an article comprising an aerosol-forming substrate or a cartridge comprising an aerosol-forming substrate. In other embodiments, the aerosol-generating device may be configured to receive an atomiser or a combination of an atomiser and an article or a cartridge comprising an aerosol-forming substrate. Where the device comprises a cavity for receiving one or more of a cartridge and an aerosol-generating article, the atomizer may be arranged in the cavity.

The aerosol-generating device may comprise a housing. In particular embodiments, the housing may be substantially circularly cylindrical. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. In particular embodiments, the material is light and non-brittle.

The primary power source and the secondary power source may comprise any suitable types of electrical power supplies. For example, the primary power source and the secondary power source may comprise one or more of batteries and capacitors. The primary power source and the secondary power source may comprise lithium ion batteries. The primary power source and the secondary power source may be rechargeable electrical power supplies. The primary power source and the secondary power source may be identical. The primary power source and the secondary power source may be different. The primary power source may have a larger size than the secondary power source of the aerosol-generating device.

The charging device may comprise electrical circuitry. The electric circuitry may be configured to control the transfer of power from the charging device to the aerosol-generating device when the charging device and the aerosol-generating device are in electrical engagement. The electric circuitry may be configured to control the transfer of data from one or more of the charging device to the aerosol-generating device and the aerosol-generating device to the charging device. The electric circuitry may comprise a microprocessor.

The aerosol-generating device may comprise electrical circuitry. The electric circuitry may be configured to control the transfer of power from the charging device to the aerosol-generating device. The electric circuitry may be configured to control the transfer of data from one or more of the charging device to the aerosol-generating device and the aerosol-generating device to the charging device. The electric circuitry may comprise a microprocessor.

FIG. 1 shows a schematic illustration of a known electrically operated aerosol-generating system. The known electrically operated aerosol-generating system comprises a charging device 1, an aerosol-generating device 20 and an aerosol-generating article 30.

The charging device 1 comprises a housing 2 having the general size and shape of a conventional packet of cigarettes. A lithium-ion battery 3 and electric circuitry 4 are housed within the charging device 1. The charging device 1 further comprises a generally circularly-cylindrical cavity 5 for receiving the aerosol-generating device 20. The cavity 5 is defined by the housing 2. A first electrical connector part (not shown) is arranged at a closed end of the cavity 5 for electrically connecting an aerosol-generating device received in the cavity 5 to the battery 3 of the charging device 1.

The aerosol-generating device 20 is substantially circularly cylindrical and has the general dimensions of a conventional cigar. The length of the device 20 is substantially identical to the length of the cavity 5 and the diameter of the device 20 is slightly smaller than the diameter of the cavity 5, such that the device 20 fits closely in the cavity 5. The aerosol-generating device 20 comprises an open cavity 21 at a proximal end for receiving an aerosol-generating article. The aerosol-generating device 20 further comprises a battery (not shown) housed in the housing of the device and an electric heater (not shown) arranged in the cavity 21 for heating at least a portion of the aerosol-generating article 30 when the aerosol-generating article 30 is received in the cavity 21.

The aerosol-generating article 30 comprises an aerosol-forming substrate (not shown) comprising a gathered, crimped sheet of tobacco, and a filter (not shown) arranged back to back with the aerosol-forming substrate in the form of a rod. The aerosol-generating article 30 has a diameter substantially equal to the diameter of the cavity 21 of the device 20 and a length longer than the cavity 21, such that when the article 30 is received in the cavity 21 of the device 20, the filter extends out of the cavity 21 and may be drawn on by a user, similarly to a convention cigarette.

In use, a user inserts the article 30 into the cavity 21 of the device 20 and turns on the device 20 to activate the electric heater. The electric heater heats the aerosol-forming substrate of the article 30 such that volatile compounds of the aerosol-forming substrate are released and atomised to form an aerosol. The user draws on the mouthpiece of the article 30 and inhales the aerosol generated from the heated aerosol-forming substrate.

After use of the device 20, the article 30 may be removed from the device 20 for disposal, and the device 20 may be placed into the charging device 1 for storage and for charging of the battery of the device 20. To place the article 30 in the charging device 1, it is necessary to closely align the longitudinal axis of the device 20 with the longitudinal axis of the cavity 5 of the charging device 1. When the device 20 is aligned with the cavity 5, the distal end of the device 20 may be inserted into the open end of the cavity 5. In some embodiments, a lid is provided to close the open end of the cavity and retain the device 20 in the cavity 5.

Figure 2:
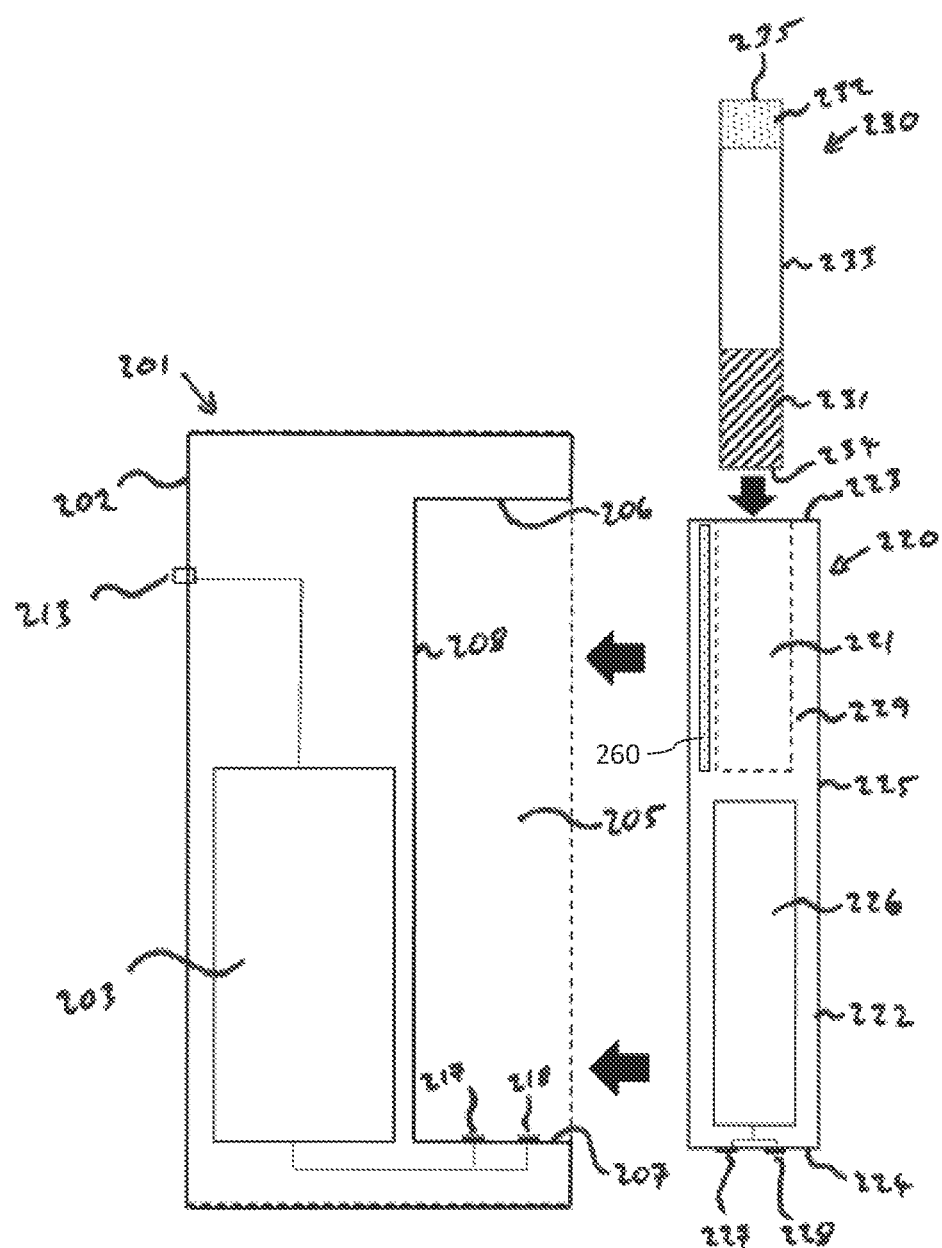
FIG. 2 shows a schematic illustration of an electrically operated aerosol-generating system according to a specific embodiment of the invention.

FIG. 2 provides a schematic illustration of a specific embodiment of an electrically operated aerosol-generating system. The system comprises A charging device 201, an aerosol-generating device 220, and an aerosol-generating article 230.

The charging device 201 comprises a housing 202 that is approximately the same size and shape as a conventional packet of cigarettes. The housing 202 locates and retains a Li-ion battery 203. This battery 203 may be termed a primary power source or primary battery of the system. The primary battery 203 is electrically connected to a charging port 213 to allow the primary battery 203 to be recharged from an external power supply such as mains power. The charging device further comprises a docking arrangement comprising a docking space 205 defined between a first end 206 and an opposing second end 207 that is both spaced from and fixed relative to the first end 206. The docking space is further defined by a rear wall 208 and first and second side walls (not shown) to form an elongate docking space 205 having a longitudinal axis extending between the first end 206 and the second end 207. The first end 206, second end 207, rear wall 208 and first and second side walls are portions of the housing 202. The docking space is not closed by a cover or lid and forms an open groove in the housing 202 of the charging device 201. First and second electrical contacts 217, 218 are located by the second end 207 and face into the docking space 205. The first and second electrical contacts are electrically connected to the primary battery 203. The charging device further comprises electric circuitry such as at least one microprocessor to control the charging and the discharge of the primary battery 203.

The aerosol-generating device has an elongated housing 222 that is substantially cylindrical having a proximal end 223, a distal end 224, and a body 225 extending between the proximal end 223 and the distal end 224. The length of the device 220 is substantially the same as the length of the longitudinal dimension of the docking space 205. First and second device contacts 227, 228 are located by the distal end 224 and face away from the distal end. The first and second device contacts are electrically connected to a device battery 226 to allow for recharging of the device battery 226. The device battery 226, which may be termed a secondary power source or secondary battery, may be any suitable battery, for example a Li-ion battery or a lithium iron phosphate battery.

A substrate receiving cavity 221 is defined in a proximal portion of the device 220 for receiving an aerosol generating article comprising an aerosol-forming substrate. The cavity 221 is substantially cylindrical and has an opening defined in the proximal end of the device. Heating elements, such as heating element 260, positioned around internal walls 229 of the substrate receiving cavity 221 are electrically connected to the device battery 226 and act to heat the cavity. In alternate embodiments the heating elements may be defined on a heating member such as a pin or a blade that is located within the cavity for insertion into an aerosol-generating article. In other embodiments, induction coils may be located around the walls 229 of the cavity 221 to inductively heat a susceptor within the cavity 221 or within an aerosol-generating article inserted into the cavity.

Electronics, including a microprocessor, are included in the aerosol-generating device for controlling charging of the device battery 226 and operation of the heating means.

The aerosol-generating article 230 is a cylindrical article comprising a plurality of components, including an aerosol-forming substrate 231 and a mouthpiece filter 232, assembled within a cigarette paper 233. The article 230 has a distal end 234 and a proximal end 235 or mouth end located downstream of the distal end 234. The aerosol-forming substrate 231 is preferably in the form of a gathered sheet of homogenised tobacco material and is located at or near to the distal end 234 of the article 230. Further components such as aerosol-cooling elements, flavouring elements and spacing elements may be positioned between the aerosol-forming substrate 231 and the mouthpiece filter 232 within the article 230.

The aerosol-generating device 220 has a longitudinal dimension that is approximately the same length as the longitudinal dimension of the docking space 205. The aerosol-generating device 220 may be engaged with the charging device 210 by aligning the longitudinal axis of the aerosol-generating device 220 with the longitudinal axis of the docking space 205, with the proximal end 223 of the aerosol-generating device 220 adjacent the first end 206 of the docking arrangement and the distal end 224 of the aerosol-generating device 220 adjacent the second end 207 of the docking arrangement. The aerosol-generating device may then be moved into engagement by a translational movement, that is a movement perpendicular to the longitudinal axis of the aerosol-generating device 220, into the docking space 205. The proximal end 223 of the aerosol-generating device 220 engages with the first end 206 and the distal end of the aerosol-generating device 224 engages with the second end 207. The first and second contacts 217, 218 align with, and make electrical contact with, the first and second device contacts 227, 228. The aerosol-generating device may be held in engagement by an interference, or frictional, engagement. Alternatively, mechanical latching means may be automatically or manually operated to retain the aerosol-generating device in engagement with the charging device. In other embodiments, magnetic latching means may be used to retain the aerosol-generating device in engagement with the charging device.

When engaged with the charging device 210, a portion of the body 225 of the aerosol-generating device 220 remains exposed to the external environment. In some embodiments the docking space is not enclosed and the majority of the body 225 of the aerosol-generating device 220 is exposed when the aerosol-generating device 220 is engaged with the charging device 201.

Charging of the device battery may be effected automatically on engagement between the aerosol-generating device 220 and the charging device 201. Alternatively, charging may require manual actuation, for example by operating a button.

The aerosol-generating device 220 may be removed from engagement with the charging device 201 by holding an exposed portion of the aerosol-generating device and moving the aerosol-generating device out of the docking space with a transverse movement. In some embodiments a mechanical latch may need to be released. In some embodiments, an extraction tool or extraction means may engage with the aerosol-generating device to push the aerosol-generating device out of the docking space. An extraction tool may simply be a member that pushes the aerosol-generating device 220 transversely out of the docking space 205.

Once the device battery 226 has been charged, the aerosol-generating device may be used for consumption of a consumable aerosol-generating article. The aerosol-generating device is removed from engagement with the charging device and the aerosol-generating article is inserted into the substrate receiving cavity 221. The heater of the device 220 is actuated and the aerosol-forming substrate 231 if the article 230 is heated to a temperature sufficient to generating an inhalable aerosol. By drawing on the proximal end 235 of the article 230, a user is able to inhale the aerosol into their mouth and lungs. Once the article has been consumed, it can be removed from the device 220, and the aerosol-generating device 220 can be returned to engagement with the charging device 201 for recharging of the device battery 226.

In some embodiments, data may be transferred between the aerosol-generating device and the charging device. The data may be transferred using the same contacts that are used for charging 217, 218, 227, 228. Alternatively, separate data contacts may be provided. Data transfer between the charging device 201 and the aerosol-generating device 220 may be achieved wirelessly, for example by BLUETOOTH® connection.

In a preferable embodiment, the first and second charging contacts 217, 218 may be in the form of concentric rings. The device charging contacts 227, 228 may be corresponding concentric rings, or may be point contacts configured to align with the respective concentric rings. The advantage of this configuration is that the aerosol-generating device may be engaged with the charging device in any radial orientation.

Figure 3:
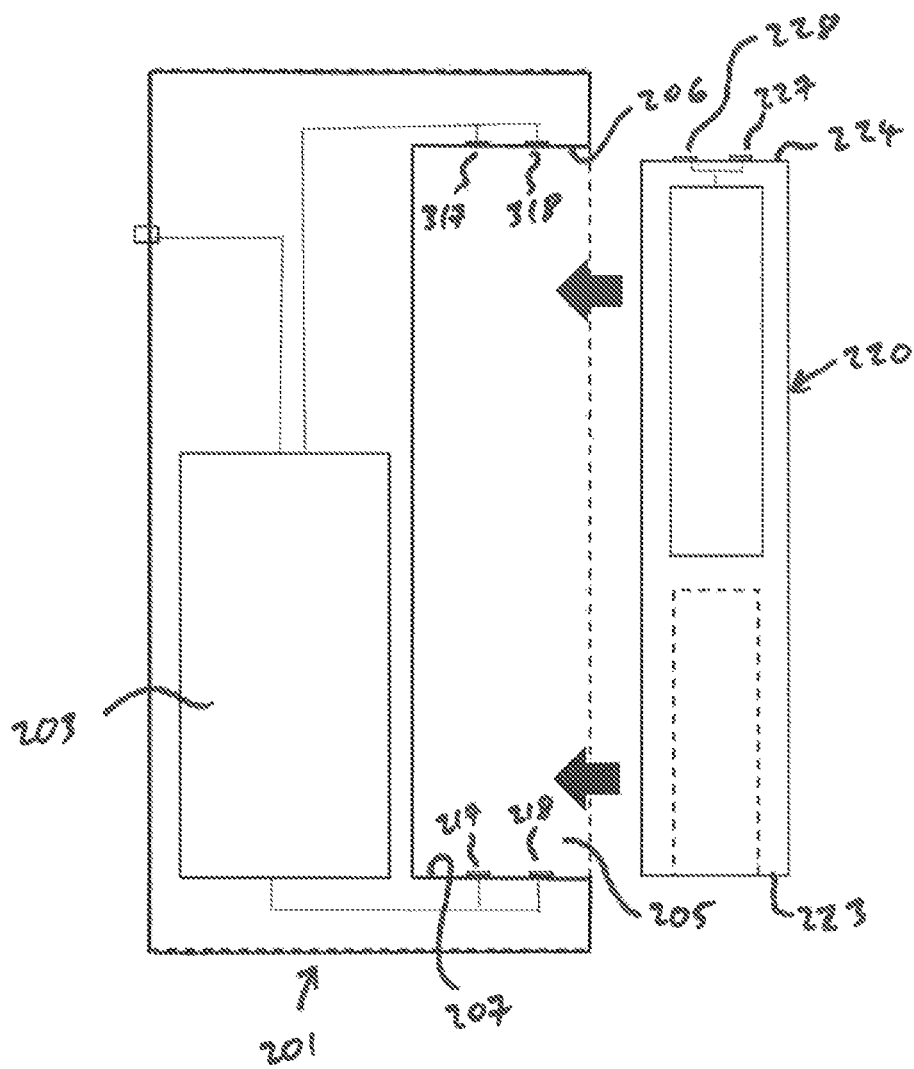
FIG. 3 shows a schematic illustration of an electrically operated aerosol-generating system according to a specific embodiment of the invention.

FIG. 3 illustrates an advantageous embodiment in which the aerosol-generating device 220 may be engaged with the charging device 201 in either possible longitudinal orientation. As well as first and second charging contacts 217, 218 located on the second end 207, the charging device 201 further comprises third and fourth 317, 318 charging contacts located on the first end 206 of the charging device 201. The third and fourth charging contacts are electrically connected to the primary battery 203. The third and fourth charging contacts 317, 318 are configured to make contact with the first and second device contacts 227, 228 if the aerosol-generating device is engaged with the charging device in an orientation in which the proximal end 223 of the aerosol-generating device is orientated to engage with the first end 206 of the charging device 201.

Figure 4:
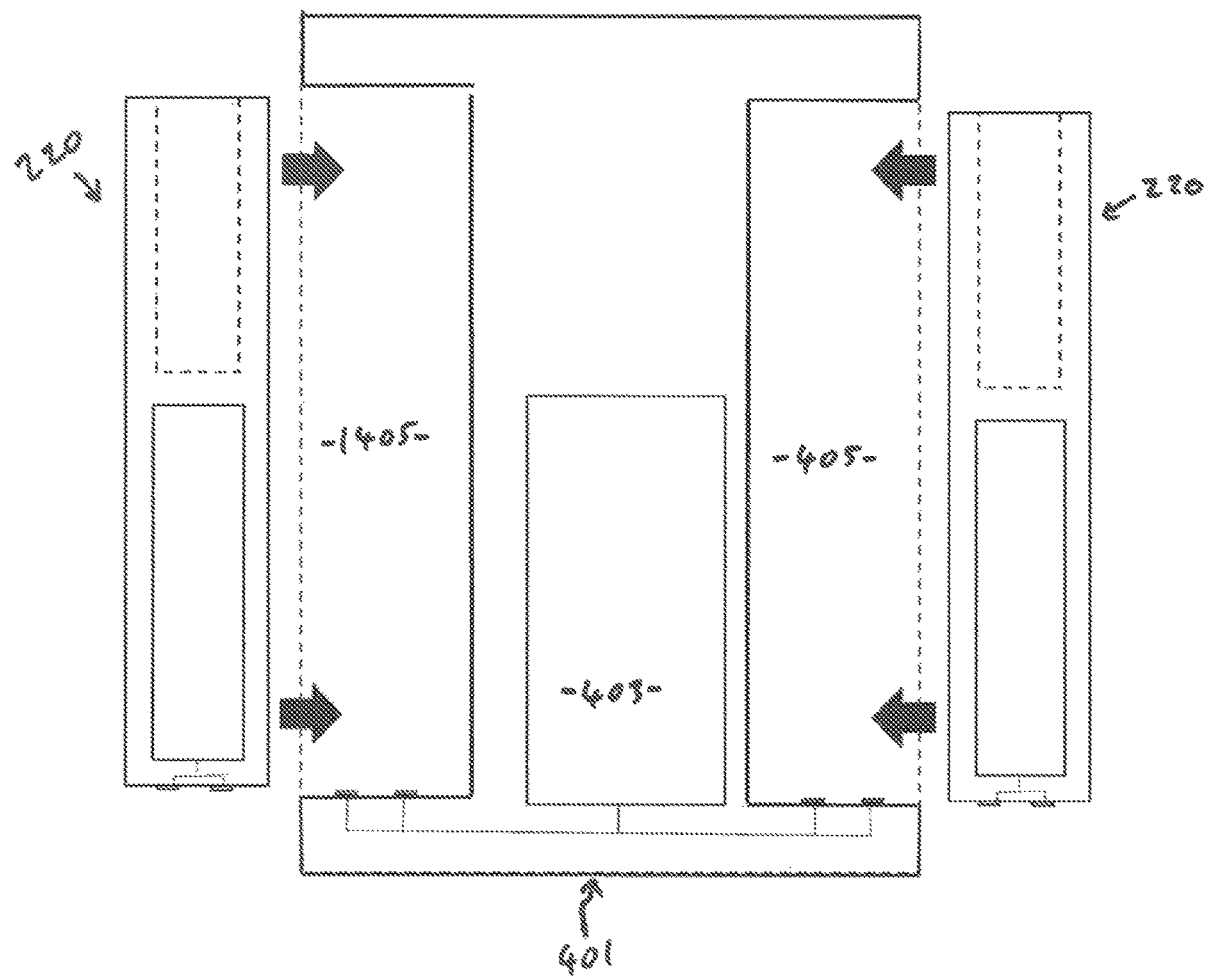
FIG. 4 shows a schematic illustration of an electrically operated aerosol-generating system according to a specific embodiment of the invention.

FIG. 4 illustrates an embodiment in which a charging device 401 defines a first docking space 405 and a second docking space 1405, both docking spaces capable of receiving an aerosol-generating device 220. The system may comprise more than one aerosol-generating device, each of which may be as described above in relation to FIG. 2. Both the first docking space 405 and the second docking space 1405 are as described above in relation to FIG. 1. Each docking space 405, 1405 has electrical contacts that are electrically connected to a battery 403 of the charging device 401. As well as retaining two aerosol-generating devices 220, this embodiment allows one aerosol-generating device to be used while a second aerosol-generating device is being recharged.

Aerosol-generating devices described above include an open cavity for receiving an aerosol-generating article. However, an aerosol generating device for use in an aerosol-generating system according to the invention may alternatively comprise a removable mouthpiece or may be configured with an internal cavity for receiving an aerosol-forming substrate. A removable mouthpiece may allow access to an internal cavity for replacing an aerosol-forming substrate, for example a solid aerosol-forming substrate. A removable mouthpiece may be a disposable component that contains an aerosol forming substrate.

Figure 5:
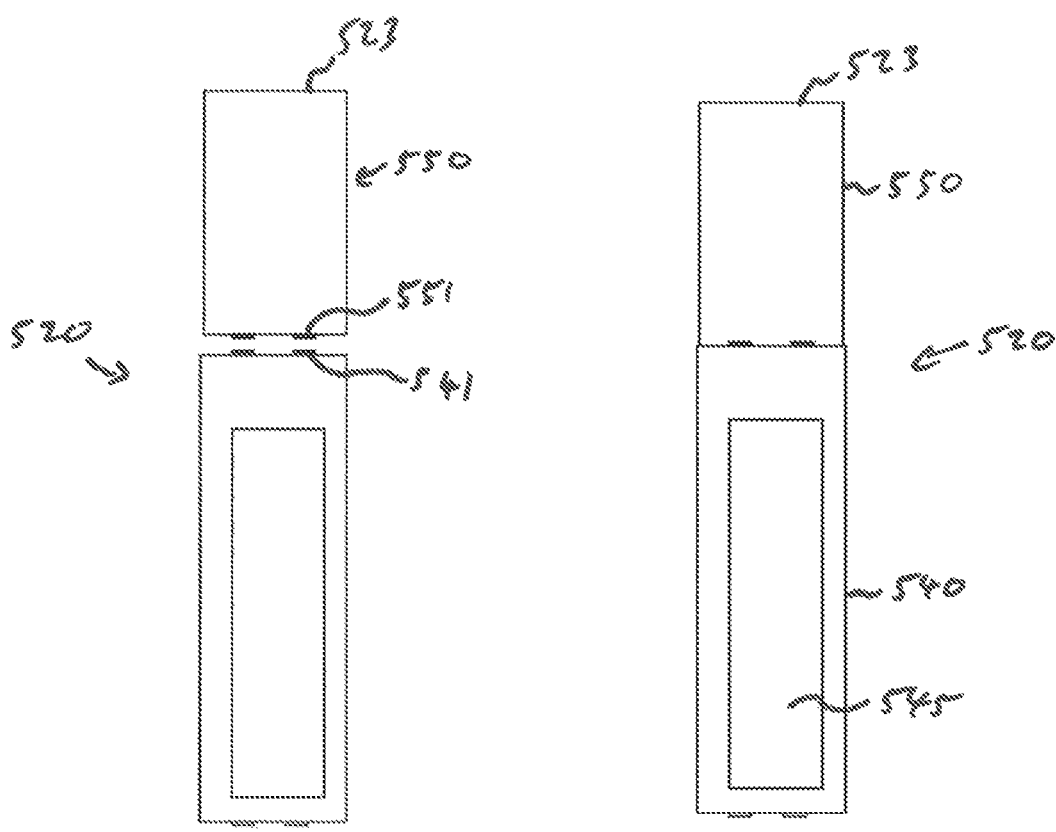
FIG. 5 shows a schematic illustration showing an embodiment of an aerosol-generating article for use in an electrically operated aerosol-generating system according to the invention.

FIG. 5 provides a schematic illustration of an aerosol-generating device 520 comprising a body portion 540, housing a battery 545, and a removable mouthpiece 550. The removable mouthpiece 550 locates a plug of homogenised tobacco, which acts as the aerosol-forming substrate, and a heating element. Electrical contacts on the mouthpiece 551 engage with electrical contacts 541 on the body portion 540 to supply electric power to the heater (not shown). A user can draw on a proximal end 523 of the mouthpiece 550 to inhale an aerosol generated by the device. The aerosol-generating device 520 is illustrated with the mouthpiece 550 both attached and separated.

Figure 6:
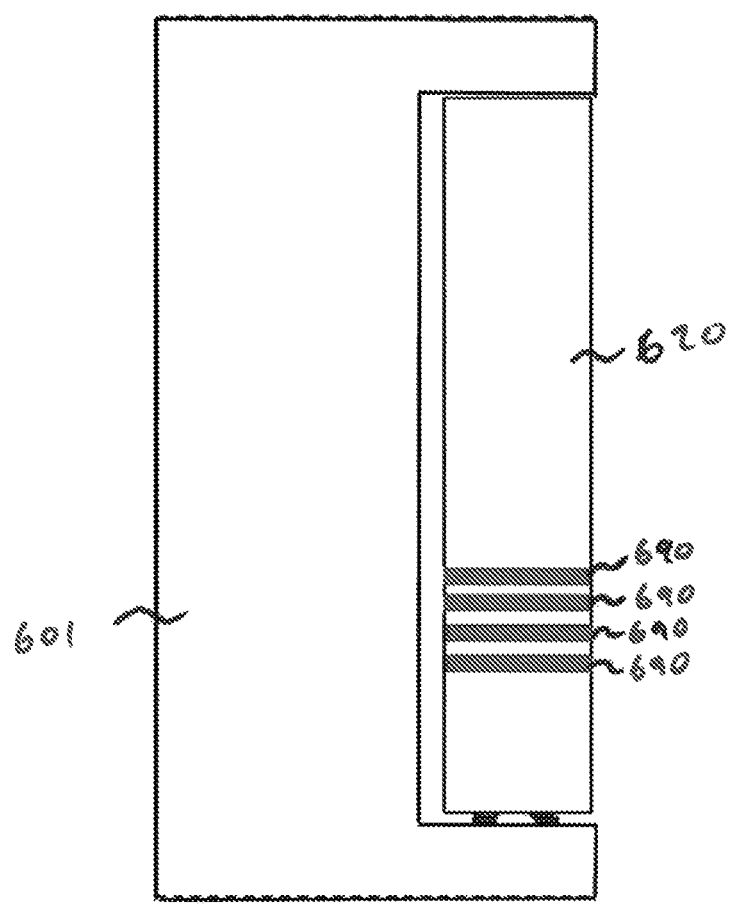
FIG. 6 shows a schematic illustration of an electrically operated aerosol-generating system according to a specific embodiment of the invention.

An aerosol-generating device for use with the system of the invention may have one or more status indication lights. FIG. 6 illustrates an embodiment of an aerosol-generating device 620 in engagement with a charging device 601. The aerosol-generating device 620 comprises four longitudinally spaced status indication lights 690. Each status indication light 690 is formed by an LED that extends around a circumference of the aerosol-generating device to enable the status lights to be viewed whatever the radial orientation that the aerosol-generating device is engaged with the charging device.

Engagement between an aerosol-generating device and a charging device may be secured by a mechanical latch mechanism. An example of such a mechanism is schematically illustrated in FIGS. 7, 8, and 9.

Figure 7:
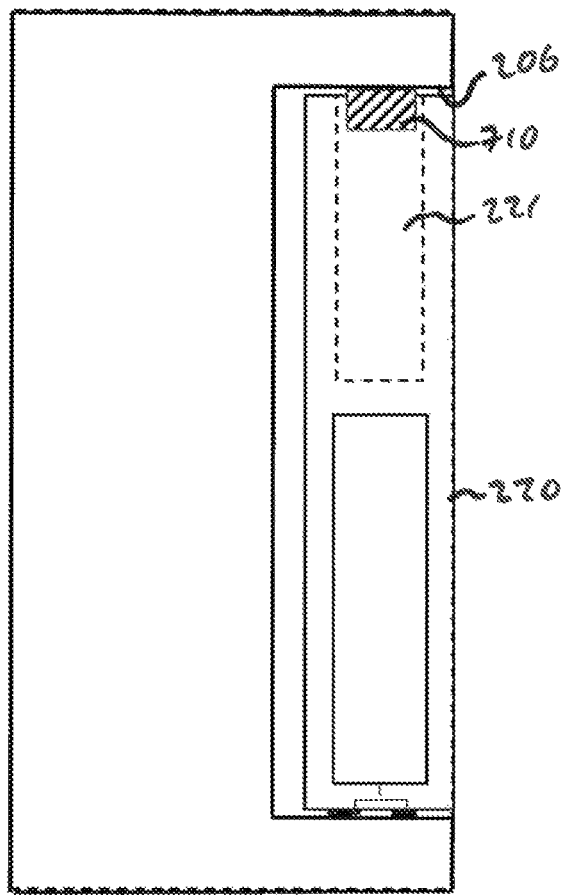
FIG. 7 shows a schematic illustration of an electrically operated aerosol-generating system according to a specific embodiment of the invention.

The system of FIG. 7 is substantially identical to that described in relation to FIG. 2. An actuatable latching member 710 is deployable from the first end 206 to engage with the substrate receiving cavity 221. The latching member 710, when deployed, extends into the cavity 221 to prevent the aerosol-generating device 220 from being withdrawn from the charging device 201.

Figure 8:
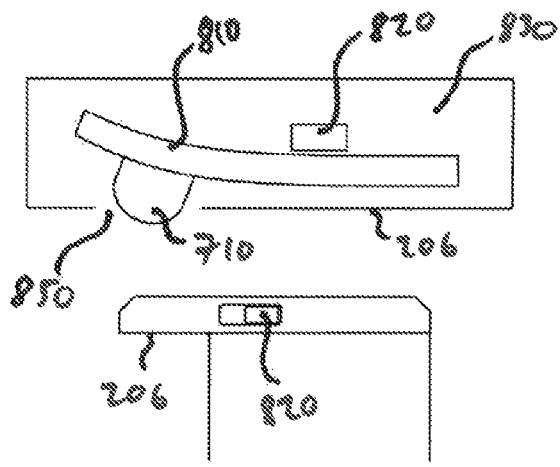
FIG. 8 shows a schematic illustration of a latching mechanism for the embodiment of FIG. 7.
Figure 9:
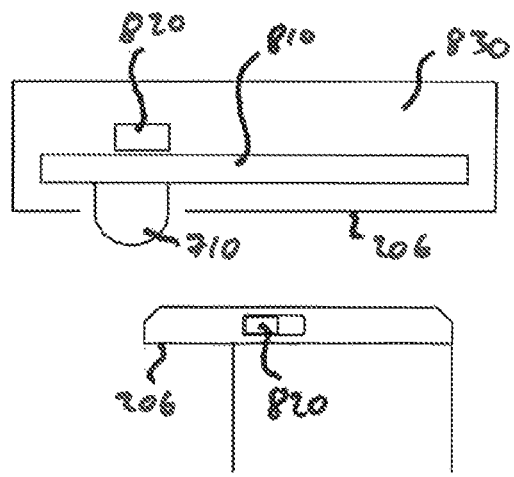
FIG. 9 shows a schematic illustration of a latching mechanism for the embodiment of FIG. 7.

One method of providing the latching mechanism is illustrated in FIGS. 8 and 9. The actuatable latching member 710 is mounted on a spring element 810 within a latch cavity 830 located at the first end 206 of the charging device 201.

The spring element 810 is biased to withdraw the latching member 710 within the cavity. A sliding button 820 is manually operable from a first position to a second position to engage with the spring element 820 and urge the latching member through an opening 850 in the first end 206 to latch with an aerosol-generating device 220. Movement of the sliding button 820 from the second position back to the first position allows the latching member 710 to be withdrawn back into the latching cavity 830.

Figure 10:
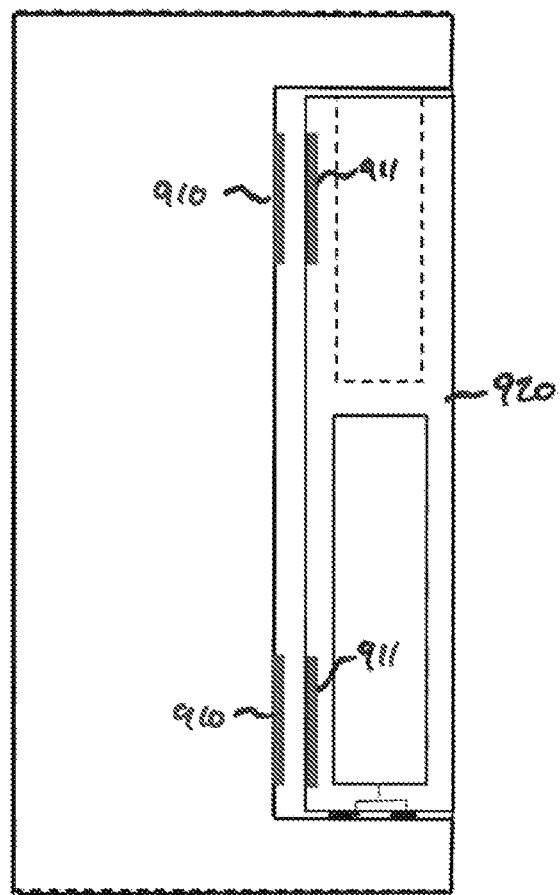
FIG. 10 shows a schematic illustration of an electrically operated aerosol-generating system according to a specific embodiment of the invention.

Engagement between an aerosol-generating device and a charging device may be secured by a magnetic latch mechanism. An example of such a mechanism is schematically illustrated in FIG. 10. The system of FIG. 7 is substantially identical to that described in relation to FIG. 2, with the exception that both the charging device 901 and the aerosol-generating device 920 comprise NdFeB magnets 910, 911 which align to latch the aerosol-generating device 920 in engagement with the charging device 901.

It will be appreciated that the above described embodiments are exemplary embodiments of the invention only. It will also be appreciated that features described above in relation to one embodiment may also be applied to other embodiments of the invention.

The invention claimed is:

1. An electrically operable aerosol-generating system, comprising:
   a charging device comprising a primary power source and a housing configured to retain the primary power source; and
   an elongated aerosol-generating device comprising a secondary power source and having a proximal end, a distal end, and a body extending between the proximal end and the distal end,
   the charging device having a docking arrangement configured to engage with the elongated aerosol-generating device, the docking arrangement comprising a docking space defined between a first end, and an opposing second end spaced from and fixed relative to the first end, the first end and the second end being walls of the housing, in which the docking space accommodates a longitudinal dimension of the elongated aerosol-generating device,
   wherein electrical contacts are disposed on at least one of the proximal end or the distal end of the elongated aerosol-generating device and are configured to engage with corresponding electrical contacts disposed on at least one of the first end and the second end of the docking arrangement, and
   wherein the electrical contacts include a positive electrical contact and a negative electrical contact, at least one of the positive and the negative electrical contacts being an annular electrical contact, the positive and the negative electrical contacts being arranged concentrically on the at least one of the proximal or the distal end of the elongated aerosol-generating device.

2. The electrically operable aerosol-generating system according to claim 1, wherein the charging device comprises corresponding electrical contacts disposed on both the first end and the second end of the docking arrangement.

3. The electrically operable aerosol-generating system according to claim 1, wherein the elongated aerosol-generating device further comprises electrical contacts disposed at the distal end, and the charging device comprises corresponding electrical contacts disposed on both the first end and the second end of the docking arrangement.

4. The electrically operable aerosol-generating system according to claim 1,
   wherein a latching projection is configured to extend from the first end or the second end to engage with the distal end or the proximal end of the elongated aerosol-generating device, and
   wherein the latching projection interacts with a corresponding dimple, depression, slot, or groove defined at the distal end or the proximal end.

5. The electrically operable aerosol-generating system according to claim 1, wherein the positive electrical contact includes an annular positive electrical contact and the negative electrical contact includes an annular negative electrical contact, the positive and the negative electrical contacts being arranged concentrically on the at least one of the first end and the second end of the docking arrangement.

6. The electrically operable aerosol-generating system according to claim 1, wherein at least a portion of the elongated aerosol-generating device remains exposed when the elongated aerosol-generating device is engaged with the charging device.

7. The electrically operable aerosol-generating system according to claim 1, wherein the docking space at least partially forms an open groove in the housing of the charging device.

8. The electrically operable aerosol-generating system according to claim 1, wherein the first end and the second end are located on projections extending from the housing of the charging device.

9. The electrically operable aerosol-generating system according to claim 1, wherein the docking space is configured to receive the elongated aerosol-generating device when urged into the docking space in a direction perpendicular to the longitudinal dimension of the elongated aerosol-generating device.

10. The electrically operable aerosol-generating system according to claim 1, wherein the docking arrangement further comprises a mechanical latch configured to releasably retain the elongated aerosol-generating device in engagement with the docking arrangement.

11. The electrically operable aerosol-generating system according to claim 1, wherein the docking arrangement further comprises a magnetic latch configured to releasably retain the elongated aerosol-generating device in engagement with the docking arrangement.

12. The electrically operable aerosol-generating system according to claim 1, wherein the elongated aerosol-generating device further comprises one or more status indication lights that extend circumferentially around the elongated aerosol-generating device.

13. The electrically operable aerosol-generating system according to claim 1, wherein the elongated aerosol generating device further comprises:
   a substrate receiving cavity configured to receive a consumable aerosol-generating article comprising an aerosol forming substrate, and
   a heating element configured to heat the consumable aerosol-generating article.

14. The electrically operable aerosol-generating system according to claim 1,
   wherein the docking arrangement is a first docking arrangement comprising a first docking space, and
   wherein the charging device further comprises a second docking arrangement configured to engage with the elongated aerosol-generating device, the second docking arrangement comprising a second docking space defined by a first end, and an opposing second end spaced from and fixed relative to the first end, the second docking space accommodating the longitudinal dimension of the elongated aerosol-generating device.

15. An aerosol-generating device for an electrically operated aerosol-generating system according to claim 1.

16. A charging device for an electrically operated aerosol-generating system according to claim 1.

17. An electrically operable aerosol-generating system, comprising:
- a charging device comprising a primary power source and a housing configured to retain the primary power source; and
- an elongated aerosol-generating device comprising a secondary power source and having a proximal end, a distal end, and a body extending between the proximal end and the distal end,
- the charging device having a docking arrangement configured to engage with the elongated aerosol-generating device, the docking arrangement comprising a docking space defined between a first end, and an opposing second end spaced from and fixed relative to the first end, the first end and the second end being walls of the housing, in which the docking space accommodates a longitudinal dimension of the elongated aerosol-generating device,
- wherein electrical contacts are disposed on at least one of the proximal end or the distal end of the elongated aerosol-generating device and are configured to engage with corresponding electrical contacts disposed on at least one of the first end and the second end of the docking arrangement, and
- wherein the electrical contacts include a positive electrical contact and a negative electrical contact, at least one of the positive and the negative electrical contacts being an annular electrical contact, the positive and the negative electrical contacts being arranged concentrically on the at least one of the proximal end or the distal end of the elongated aerosol-generating device and/or wherein electrical contacts disposed on at least one of the first end and the second end of the docking arrangement include an annular positive electrical contact and an annular negative electrical contact, the positive and the negative electrical contacts being arranged concentrically on the at least one of the first end and the second end of the docking arrangement.

18. The electrically operable aerosol-generating system according to claim 17,
- wherein a latching projection is configured to extend from the first end or the second end to engage with the distal end or the proximal end of the elongated aerosol-generating device, and
- wherein the latching projection interacts with a corresponding dimple, depression, slot, or groove defined at the distal end or the proximal end.

19. The electrically operable aerosol-generating system according to claim 17, wherein the docking space is configured to receive the elongated aerosol-generating device when urged into the docking space in a direction perpendicular to the longitudinal dimension of the elongated aerosol-generating device.

20. The electrically operable aerosol-generating system according to claim 17, wherein the elongated aerosol-generating device further comprises one or more status indication lights that extend circumferentially around the elongated aerosol-generating device.

* * * * *